United States Patent
Udono et al.

(10) Patent No.: US 11,984,568 B2
(45) Date of Patent: May 14, 2024

(54) BATTERY SYSTEM AND AIRCRAFT EQUIPPED WITH THE SAME

(71) Applicant: Honda Motor Co., Ltd., Tokyo (JP)

(72) Inventors: Kenro Udono, Saitama (JP); Tomoyo Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 17/674,815

(22) Filed: Feb. 17, 2022

(65) Prior Publication Data

US 2022/0311069 A1    Sep. 29, 2022

(30) Foreign Application Priority Data

Mar. 23, 2021  (JP) ................. 2021-048246

(51) Int. Cl.
| | |
|---|---|
| H01M 10/613 | (2014.01) |
| H01M 10/617 | (2014.01) |
| H01M 10/6555 | (2014.01) |
| H01M 10/6568 | (2014.01) |
| H01M 50/55 | (2021.01) |

(52) U.S. Cl.
CPC ....... *H01M 10/617* (2015.04); *H01M 10/613* (2015.04); *H01M 10/6555* (2015.04); *H01M 10/6568* (2015.04); *H01M 50/55* (2021.01); *H01M 2220/20* (2013.01)

(58) Field of Classification Search
CPC ............. H01M 50/55; H01M 2220/20; H01M 10/613; H01M 10/6555; H01M 10/617
See application file for complete search history.

(56) References Cited

U.S. PATENT DOCUMENTS

2022/0285753 A1* 9/2022 Rainville et al. ... H01M 10/625

FOREIGN PATENT DOCUMENTS

| | | | |
|---|---|---|---|
| JP | 2013069417 A  * | 4/2013 | ............ H01M 10/50 |
| JP | 2013161559 | 8/2013 | |
| JP | 2013222603 | 10/2013 | |

OTHER PUBLICATIONS

Nishimori, JP2013069417 A, Google machine translation, 2013 (Year: 2013).*

* cited by examiner

*Primary Examiner* — Haroon S. Sheikh
*Assistant Examiner* — Kan Luo
(74) *Attorney, Agent, or Firm* — JCIPRNET (57) ABSTRACT

A battery module includes a plurality of battery sets in which first unit cells and second unit cells are adjacent to each other. In the first unit cell, a positive electrode terminal and a negative electrode terminal are oriented and extend in a first direction from a first end portion of a first main body. In the second unit cell, a positive electrode terminal and a negative electrode terminal are oriented and extend in a second direction opposite to the first direction from a first end portion of a second main body. Then, in the battery set, at least a part of the first main body and the second main body overlap and are in contact with each other. Further, a heat conductive material that conducts heat from the first unit cell or the second unit cell is in contact with the battery set.

10 Claims, 11 Drawing Sheets

BATTERY SYSTEM AND AIRCRAFT EQUIPPED WITH THE SAME

CROSS-REFERENCE TO RELATED APPLICATION

This application claims the priority benefits of Japanese application no. 2021-048246, filed on Mar. 23, 2021. The entirety of the above-mentioned patent application is hereby incorporated by reference herein and made a part of this specification.

BACKGROUND

Technical Field

The disclosure relates to a battery system having a plurality of battery modules and an aircraft equipped with the battery system.

Description of Related Art

An electric multicopter equipped with a battery pack is known as a kind of aircraft. In this case, the multicopter is provided with lift generators such as propellers or ducted fans. Further, the airframe is equipped with a motor for rotating the lift generator, and the battery pack for supplying electric power to the motor. In some cases, an additional generator may be installed to supply electric power to the battery pack and the motor. Then, the battery pack is discharged or charged by the generator according to the flight state of the multicopter. The battery pack is configured by electrically connecting a plurality of battery modules housed in one casing.

During charging and discharging, the temperature of the unit cells that constitute the battery module rises and the unit cells become hot. In order to prevent the temperature of the unit cells from rising excessively, the heat is removed from the unit cells as much as possible. For example, according to the technique described in Patent Document 1, a heat absorbing part is arranged between a plurality of laminated unit cell rows. Further, Patent Document 2 proposes a configuration in which a heat transfer material is interposed between the unit cells and the heat transfer material is brought into contact with a water jacket.

RELATED ART

Patent Documents

[Patent Document 1] Japanese Laid-Open No. 2013-222603
[Patent Document 2] Japanese Laid-Open No. 2013-161559

As shown in FIG. 2 of Patent Document 2, the main body of a general unit cell is shaped like a thin rectangular parallelepiped (square pillar). Then, a positive electrode terminal and a negative electrode terminal project from the same end surface of the main body, and are oriented and extend in the same direction. In the main body of the unit cell having such a configuration, the temperature rises most at the end portion on the side where the positive electrode terminal and the negative electrode terminal project. That is, a heat distribution or a temperature difference occurs in the unit cell. Therefore, it is desired to equalize the heat in each unit cell and reduce the temperature difference as much as possible.

The technique described in Patent Document 1 is to cover the laminated unit cell rows with a heat absorbing part as described above. Therefore, it is difficult to substantially equalize the heat of each unit cell.

Further, according to the configuration described in Patent Document 2, the unit cells and the heat transfer material are alternately arranged in parallel so it is considered that heat can be quickly taken from the unit cells. However, the amount of heat transferred from the unit cells to the heat transfer material is almost the same regardless of the portions. That is, it is difficult for a single heat transfer material to absorb a large amount of heat from the high heat portion of the unit cell and absorb a small amount of heat from the low heat portion. Therefore, even with the technique described in Patent Document 2, it is difficult to substantially equalize the heat of each unit cell.

SUMMARY

According to an embodiment of the disclosure, a battery system is provided, including a battery module having a plurality of unit cells in which positive electrode terminals and negative electrode terminals are oriented and extend in a same direction. A plurality of battery sets are arranged in parallel, in which first unit cells and second unit cells are adjacent to each other. The first unit cell has a positive electrode terminal and a negative electrode terminal oriented and extending in a first direction from a first end portion of a first main body that has the first end portion and a second end portion, and the second unit cell has a positive electrode terminal and a negative electrode terminal oriented and extending in a second direction, which is opposite to the first direction, from a first end portion of a second main body that has the first end portion and a second end portion. In the battery set, at least a part of the first main body and the second main body overlap and are in contact with each other, and a heat conductive material that conducts heat from the first unit cell or the second unit cell is in contact with the battery set. An aircraft equipped with the same is also provided.

DESCRIPTION OF THE EMBODIMENTS

The disclosure provides a battery system that can equalize the heat in each unit cell and avoid a large-scale cooling facility, and an aircraft equipped with the battery system.

According to an embodiment of the disclosure, a battery system is provided, including a battery module having a plurality of unit cells in which positive electrode terminals and negative electrode terminals are oriented and extend in a same direction. A plurality of battery sets are arranged in parallel, in which first unit cells and second unit cells are adjacent to each other. The first unit cell has a positive electrode terminal and a negative electrode terminal oriented and extending in a first direction from a first end portion of a first main body that has the first end portion and a second end portion, and the second unit cell has a positive electrode terminal and a negative electrode terminal oriented and extending in a second direction, which is opposite to the first direction, from a first end portion of a second main body that has the first end portion and a second end portion. In the battery set, at least a part of the first main body and the second main body overlap and are in contact with each other, and a heat conductive material that conducts heat from the first unit cell or the second unit cell is in contact with the battery set. An aircraft equipped with the same is also provided.

According to the disclosure, the first unit cell and the second unit cell in the battery set overlap so that the first end portion having a high temperature is in contact with the second end portion having a low temperature or the heat conductive material, for example. On the other hand, the first unit cell and the second unit cell overlap so that the second end portion is in contact with the first end portion having a high temperature or the second end portion of the remaining unit cell, for example. In this way, by constructing the battery set to prevent the first end portions from coming into contact with each other, it is possible to equalize the heat in each of the first and second unit cells.

That is, heat can be sufficiently removed from the first end portion that has a high temperature. Therefore, a part of the first unit cell or the second unit cell is prevented from becoming hot locally. Accordingly, a large-scale cooling facility is not required.

Therefore, when a battery system including the above-described battery module is mounted on an aircraft, the flexibility in the device layout is improved. Further, since it is not required to install a large-scale cooling facility, the total weight of the aircraft can be reduced. The power consumption can also be reduced.

Hereinafter, a battery system according to the disclosure will be described in detail with reference to the accompanying drawings based on suitable embodiments in relation to an aircraft equipped with the battery system. In the following, "front" and "rear" refer to the front and rear in a flight direction of the aircraft (multicopter 10 shown in FIG. 1). In addition, "down" and "up" are directions facing the lower side and the upper side of the aircraft. Further, "left" and "right" indicate the left and right when the front is visually recognized from the inside of the aircraft. The "width direction" is synonymous with "left-right direction".

In addition, although a first unit cell 54 and a second unit cell 56, which will be described later, are the same, they are assigned with different names and reference numerals in order to simplify the explanation and facilitate understanding.

Figure 1:
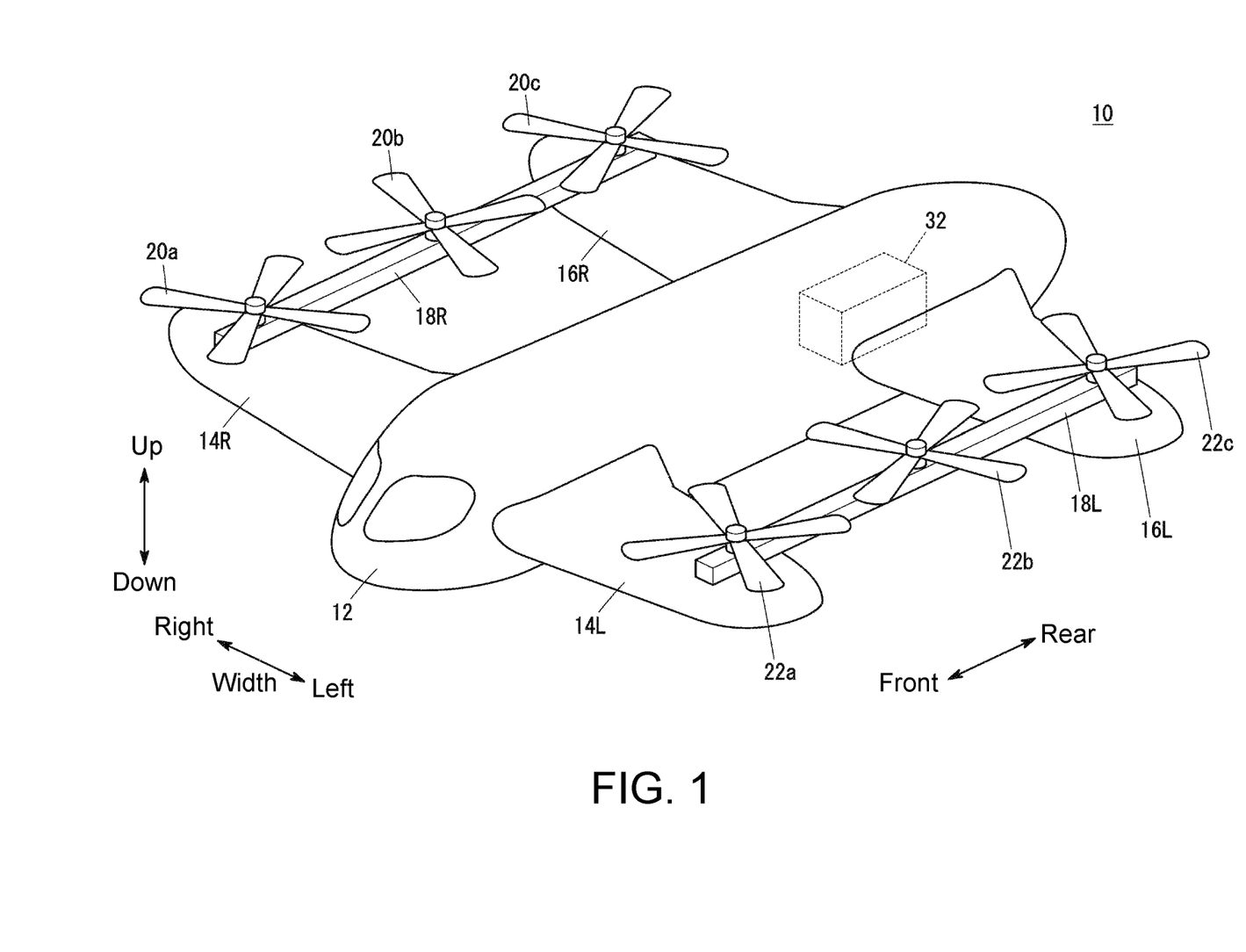
FIG. 1 is a schematic perspective view of an aircraft (multicopter) according to an embodiment of the disclosure.

FIG. 1 is a schematic perspective view of the multicopter 10 that serves as the aircraft according to the present embodiment. The multicopter 10 includes an airframe 12, a right main wing 14R and a left main wing 14L that project from the front side of the airframe 12 and extend in the width direction, and a right horizontal stabilizer 16R and a left horizontal stabilizer 16L that project from the rear side of the airframe 12 and extend in the width direction. Further, a right support bar 18R is bridged from the right main wing 14R to the right horizontal stabilizer 16R, and a left support bar 18L is bridged from the left main wing 14L to the left horizontal stabilizer 16L.

Propellers 20a to 20c are provided on the right main wing 14R, the right support bar 18R, and the right horizontal stabilizer 16R, respectively. Propellers 22a to 22c are provided on the left main wing 14L, the left support bar 18L, and the left horizontal stabilizer 16L, respectively. The six propellers 20a to 20c and 22a to 22c are lift generators. That is, the multicopter 10 can take off or fly in the air under the action of the six propellers 20a to 20c and 22a to 22c.

Figure 2:
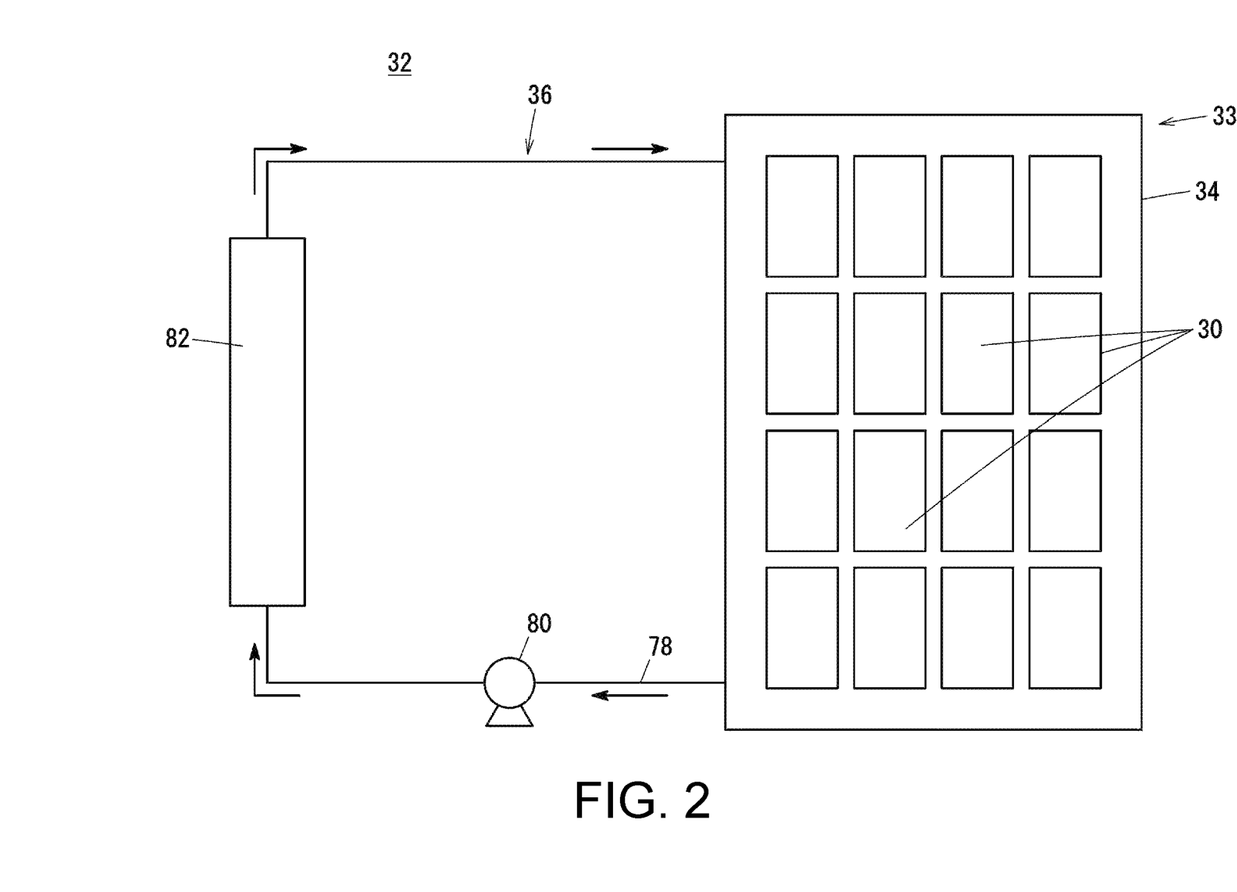
FIG. 2 is a schematic configuration view of main parts of a battery system including battery modules.

The airframe 12 is equipped with the same number of motors (not shown) as the propellers 20a to 20c and 22a to 22c, and a battery system 32 including battery modules 30 (see FIG. 2). The rotor blades of the propellers 20a to 20c and 22a to 22c are individually connected to the rotation shafts of the motors. When electric power is supplied to the motor from a battery pack 33 (see FIG. 2) that constitutes the battery system 32, the motor is energized. Thereby, the rotation shaft rotates, and the rotor blades rotate integrally with the rotation shaft. As the propellers 20a to 20c and 22a to 22c are energized in this way, the multicopter 10 can take off or fly in the air.

Next, the battery system 32 according to the first embodiment will be described with reference to FIG. 2 to FIG. 6 in relation to the battery modules 30 included therein. In this case, the battery system 32 includes the battery pack 33, in which a plurality of (for example, about 20) battery modules 30 are housed in a casing 34, and a cooling facility 36.

Figure 3:
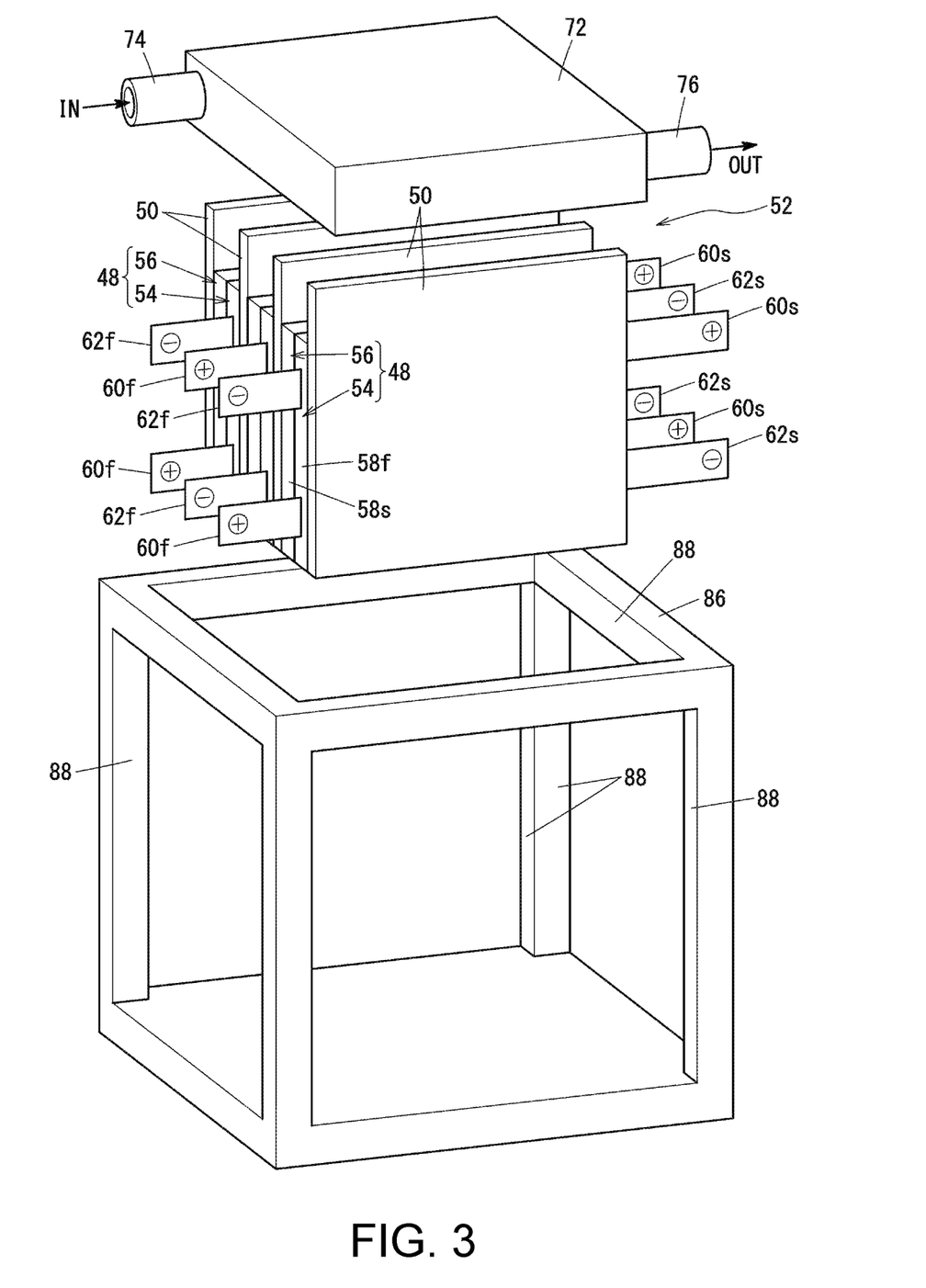
FIG. 3 is an exploded perspective view of main parts of the battery module included in the battery system according to the first embodiment.
Figure 4:
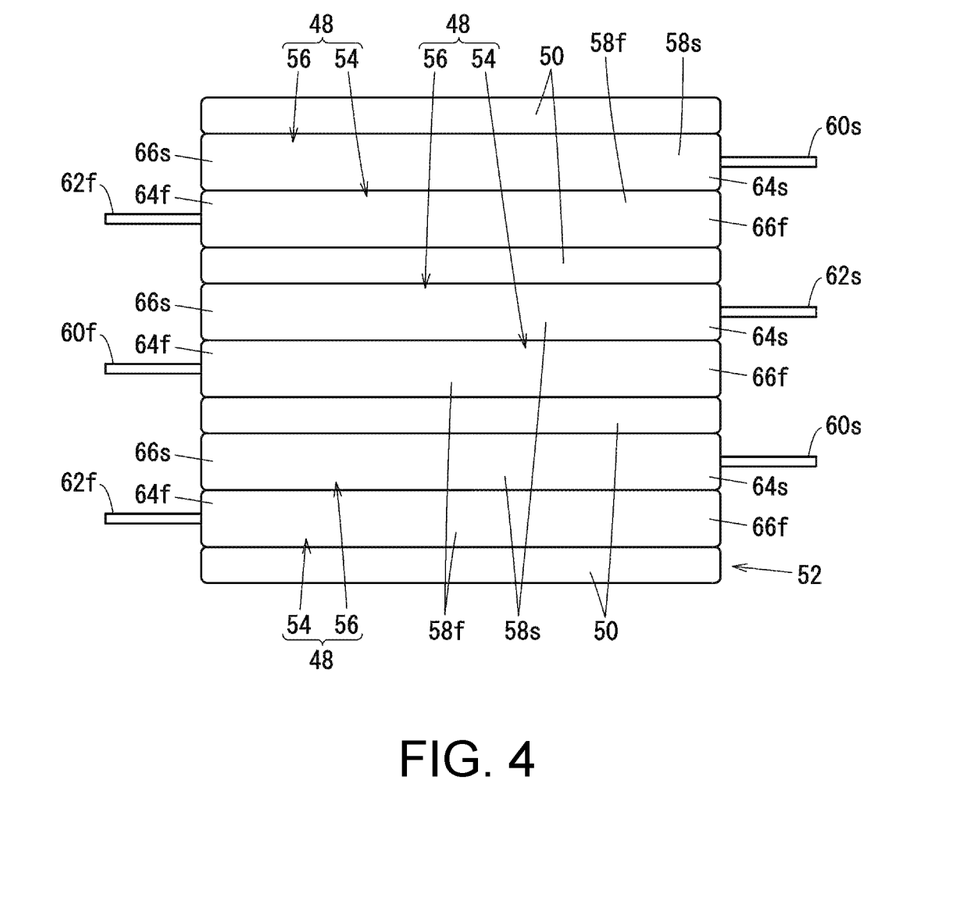
FIG. 4 is a plan view of main parts of a laminated body constituting the battery module.

As shown in FIG. 3 and FIG. 4, each battery module 30 has a plurality of battery sets 48 and a heat conductive material 50 interposed between the battery sets 48. A laminated body 52 is formed by alternately laminating a plurality of battery sets 48 and the heat conductive material 50. As shown in FIG. 4 in which the laminated body 52 is viewed in a plan view, the battery set 48 is composed of a combination of one first unit cell 54 and one second unit cell 56. The first unit cell 54 and the second unit cell 56 are composed of, for example, lithium ion batteries.

As shown in FIG. 3 and FIG. 4, the first unit cell 54 has a first main body 58f having a substantially quadrangular shape, and a positive electrode terminal 60f and a negative electrode terminal 62f projecting in a tab shape from the first main body 58f. The positive electrode terminal 60f and the negative electrode terminal 62f project from a first end portion 64f of the first main body 58f and are oriented and extend in the same direction (first direction). Here, assuming that the end portion of the first main body 58f opposite to the first end portion 64f is a second end portion 66f, the second end portion 66f faces a second direction opposite to the first direction. The first direction is, for example, to the right in the width direction of the multicopter 10, and in this case, the second direction is to the left in the width direction of the multicopter 10.

The second unit cell 56 has a second main body 58s having a substantially quadrangular shape, and a positive electrode terminal 60s and a negative electrode terminal 62s projecting in a tab shape from the second main body 58s. The positive electrode terminal 60s and the negative electrode terminal 62s project from a first end portion 64s of the second main body 58s and are oriented and extend in the second direction. The second main body 58s has a second end portion 66s which is an end portion opposite to the first end portion 64s and faces the first direction opposite to the second direction. That is, in the first embodiment, the extending direction of the positive electrode terminal 60f and the negative electrode terminal 62f of the first unit cell 54 and the extending direction of the positive electrode terminal 60s and the negative electrode terminal 62s of the second unit cell 56 are opposite to each other.

In the first embodiment, the first unit cell 54 and the second unit cell 56 are in a lying position in which the positive electrode terminals 60f and 60s and the negative electrode terminals 62f and 62s face the width direction of the multicopter 10. Then, the first main body 58f and the second main body 58s are adjacent to and in contact with each other so that the first end portion 64f of the first main body 58f faces the second end portion 66s of the second main body 58s and the second end portion 66f of the first main body 58f faces the first end portion 64s of the second main body 58s. Here, the lengths, heights, and thicknesses of the first main body 58f and the second main body 58s are substantially the same as each other. Therefore, in the battery set 48, the entire second main body 58s is in contact with the entire first main body 58f.

The battery set 48 is sandwiched between two heat conductive materials 50. One heat conductive material 50 is sandwiched between adjacent battery sets 48. Therefore, another heat conductive material 50 is not in contact with the heat conductive material 50. Preferable examples of the heat conductive material 50 include a so-called vapor chamber, that is, a plate-shaped (planar type) heat pipe, a graphite sheet, etc.

Figure 5A:
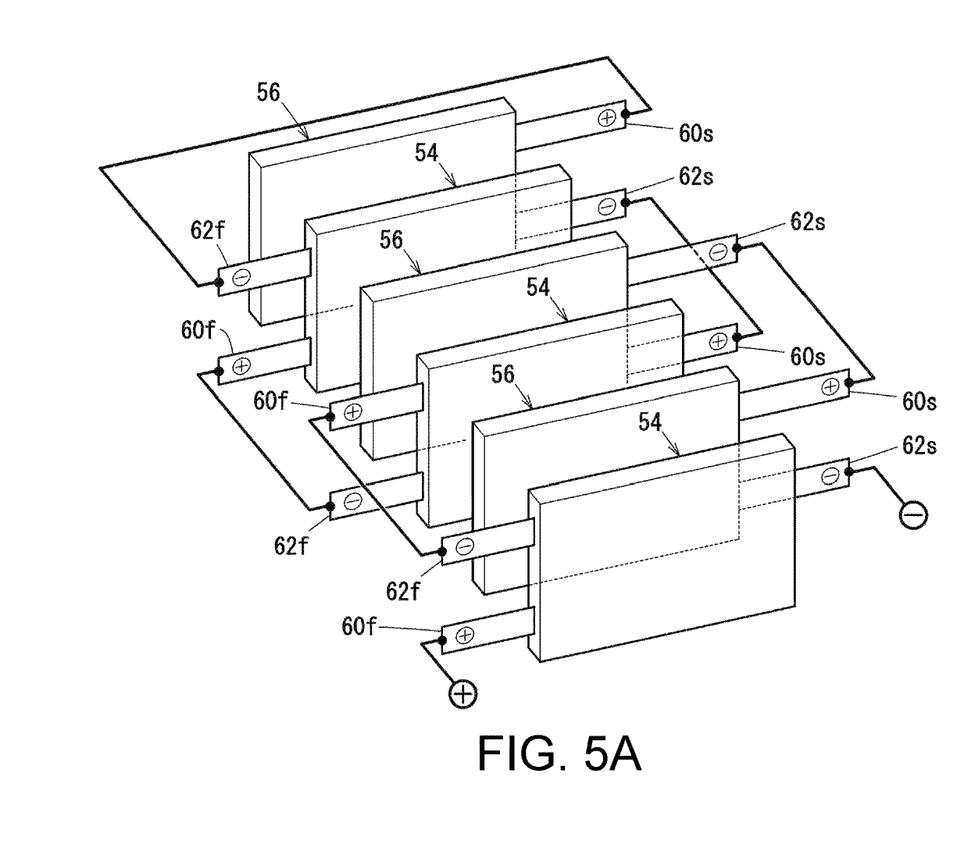
FIG. 5A is a connection explanatory view showing a relationship of electrical connection between a positive electrode terminal and a negative electrode terminal.
Figure 6:
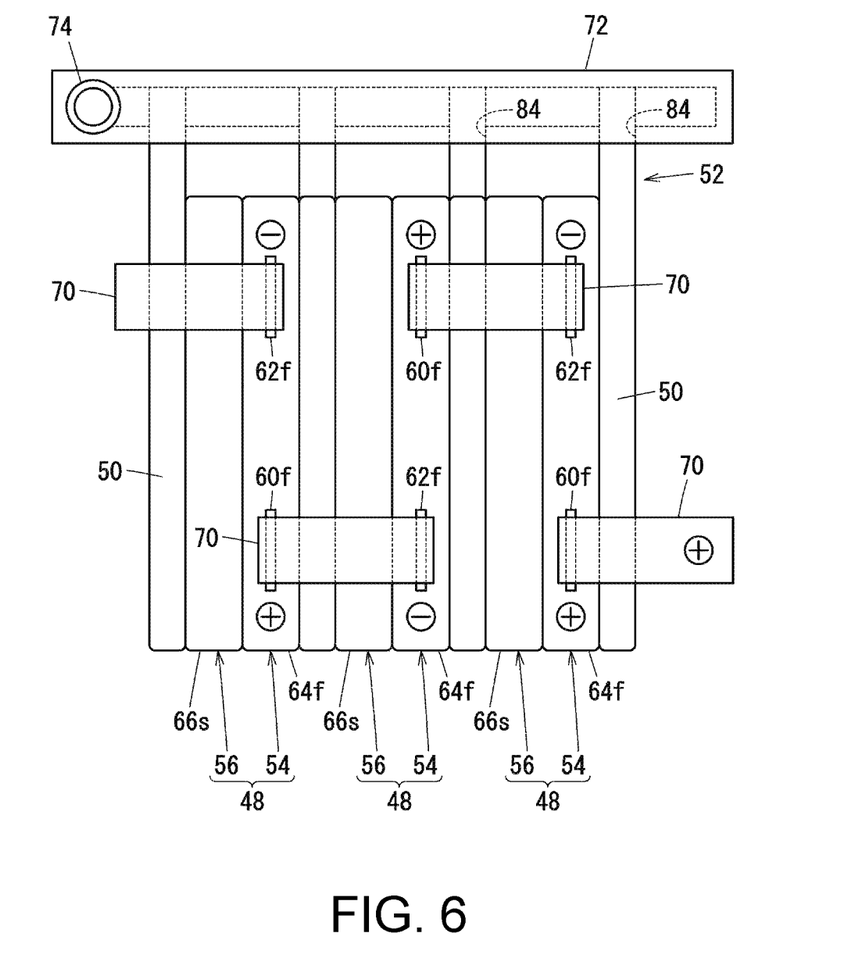
FIG. 6 is a side view of main parts of the laminated body.

For the first unit cell 54 of any battery set 48 and the first unit cell 54 of another battery set 48 adjacent to the battery set 48, the positive electrode terminals 60f (and the negative electrode terminals 62f) are turned upside down. That is, as shown in FIG. 5A and FIG. 6, when the positive electrode terminal 60f is located below and the negative electrode terminal 62f is located above in the first unit cell 54 of any battery set 48, the positive electrode terminal 60f is located above and the negative electrode terminal 62f is located below in the first unit cell 54 of the adjacent battery set 48. The same applies to the second unit cell 56.

Then, via a bus bar 70 (see FIG. 6), the negative electrode terminal 62f of the first unit cell 54 is electrically connected to the positive electrode terminal 60f of the first unit cell 54 of the adjacent battery set 48 on the back side of the paper surface of FIG. 5A (on the left side of the paper surface of FIG. 6). Further, the negative electrode terminal 62f of the first unit cell 54 is electrically connected to the positive electrode terminal 60f of the first unit cell 54 of the adjacent battery set 48 on the back side of the paper surface of FIG. 5A (on the left side of the paper surface of FIG. 6). This is repeated thereafter. Then, in the battery set 48 at the end portion in the laminating direction located on the innermost side of the paper surface of FIG. 5A, in other words, on the leftmost side of FIG. 6, the negative electrode terminal 62f of the first unit cell 54 is electrically connected to the positive electrode terminal 60s of the second unit cell 56 in the same battery set 48 (see FIG. 5A).

Figure 5B:
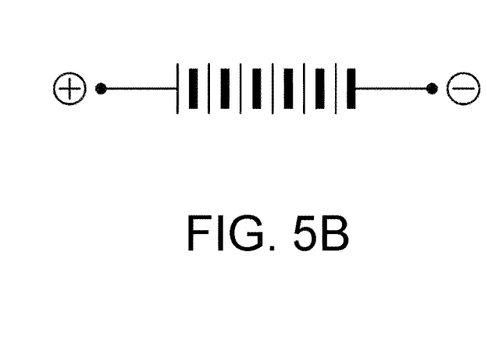
FIG. 5B is an equivalent circuit thereof.

The negative electrode terminal 62s of the second unit cell 56 is electrically connected to the positive electrode terminal 60s of the second unit cell 56 of the adjacent battery set 48 on the front side of the paper surface of FIG. 5A (on the right side of the paper surface of FIG. 6). Further, the negative electrode terminal 62s of the second unit cell 56 is electrically connected to the positive electrode terminal 60s of the second unit cell 56 of the adjacent battery set 48 on the front side of the paper surface of FIG. 5A (on the right side of the paper surface of FIG. 6). This is repeated thereafter. Therefore, in the first embodiment, all the unit cells 54 and 56 are electrically connected in series. The equivalent circuit at this time is shown in FIG. 5B.

Returning to FIG. 3, a cooling jacket 72 that serves as a heat capturing part is disposed above the laminated body 52. A refrigerant inlet pipe 74 and a refrigerant outlet pipe 76 extend from the cooling jacket 72 that also serves as a part of the cooling facility 36. The refrigerant outlet pipe 76 therein is connected to the refrigerant inlet pipe 74 of another battery module 30. That is, the cooling medium supplied to any one battery module 30 circulates in the cooling jacket 72 attached to the battery module 30, and then the cooling medium moves to the cooling jacket 72 attached to another battery module 30 and circulates in the cooling jacket 72.

As shown in FIG. 2, the cooling facility 36 including the cooling jacket 72 included in the casing 34 is attached to the battery module 30. Specifically, a circulation supply pipe 78 is connected to the refrigerant inlet pipe 74 of the cooling jacket 72, which is the first in the circulation order of the cooling medium, and the refrigerant outlet pipe 76 of the cooling jacket 72, which is the last. A circulation pump 80 and a cooling heat exchanger 82 are interposed in the circulation supply pipe 78, and the cooling medium is sent out from the circulation supply pipe 78 to the refrigerant inlet pipe 74 by the circulation pump 80, and returns to the circulation supply pipe 78 via the refrigerant outlet pipe 76. The cooling medium returned to the circulation supply pipe 78 is cooled by the atmosphere in contact with the cooling heat exchanger 82 while flowing through the cooling heat exchanger 82, for example. After cooling, the cooling medium is resupplied to the cooling jacket 72. When the battery module 30 (or the battery pack 33) is at a high temperature and it is required to protect the unit cell 40 or the battery module 30, the cooling medium is circulated and supplied to the cooling jacket 72 in this way.

FIG. 6 also shows a vertical cross section of the cooling jacket 72. As shown in FIG. 6, a plurality of slits 84 are formed on the lower surface of the cooling jacket 72, and the upper ends of the heat conductive materials 50 are inserted into the cooling jacket 72 via the slits 84. Thereby, the heat conductive materials 50 are supported by the cooling jacket 72. Of course, the space between the slit 84 and the heat conductive material 50 is sealed with a sealing material or the like. Further, the heat conductive material 50 is joined to the cooling jacket 72 with a brazing material or the like.

The laminated body 52 and the cooling jacket 72 are housed in a hollow square tubular module case 86 shown in FIG. 3. Thereby, the battery module 30 is configured. An opening 88 is formed on each end surface of the module case 86 to prevent heat from being trapped inside.

The battery system 32 according to the first embodiment basically includes the battery module 30 configured as described above. As described above, the battery pack 33 is configured by housing a plurality of battery modules 30 in the casing 34. Of course, the module case 86 is positioned and fixed to the inner wall (for example, the bottom wall) of the casing 34 via bolts or the like. Next, the operation and effect of the battery module 30 will be described.

The multicopter 10 shown in FIG. 1 can take off and fly by energizing the motors supplied with the electric power from the battery pack 33. That is, as the rotation shafts of the motors rotate, the rotor blades of the propellers 20a to 20c and 22a to 22c rotate following the rotation shafts, which creates lift that raises or flies the multicopter 10. Further, the circulation pump 80 is energized, and the cooling medium is sequentially supplied to each battery module 30 from the circulation supply pipe 78 and the refrigerant inlet pipe 74. The cooling medium returns to the circulation supply pipe 78 via the refrigerant outlet pipe 76.

High output is required for the motor during takeoff and landing. Therefore, a large amount of power supply is required for the battery pack 33 (the first unit cell 54 and the second unit cell 56). That is, the required electric power becomes large, and a large current is discharged from the first unit cell 54 and the second unit cell 56. Furthermore, in a case where the multicopter 10 is equipped with a generator, surplus electric power is generated when the output of the motor is small. The surplus electric power is used to charge the first unit cell 54 and the second unit cell 56.

Figure 7:
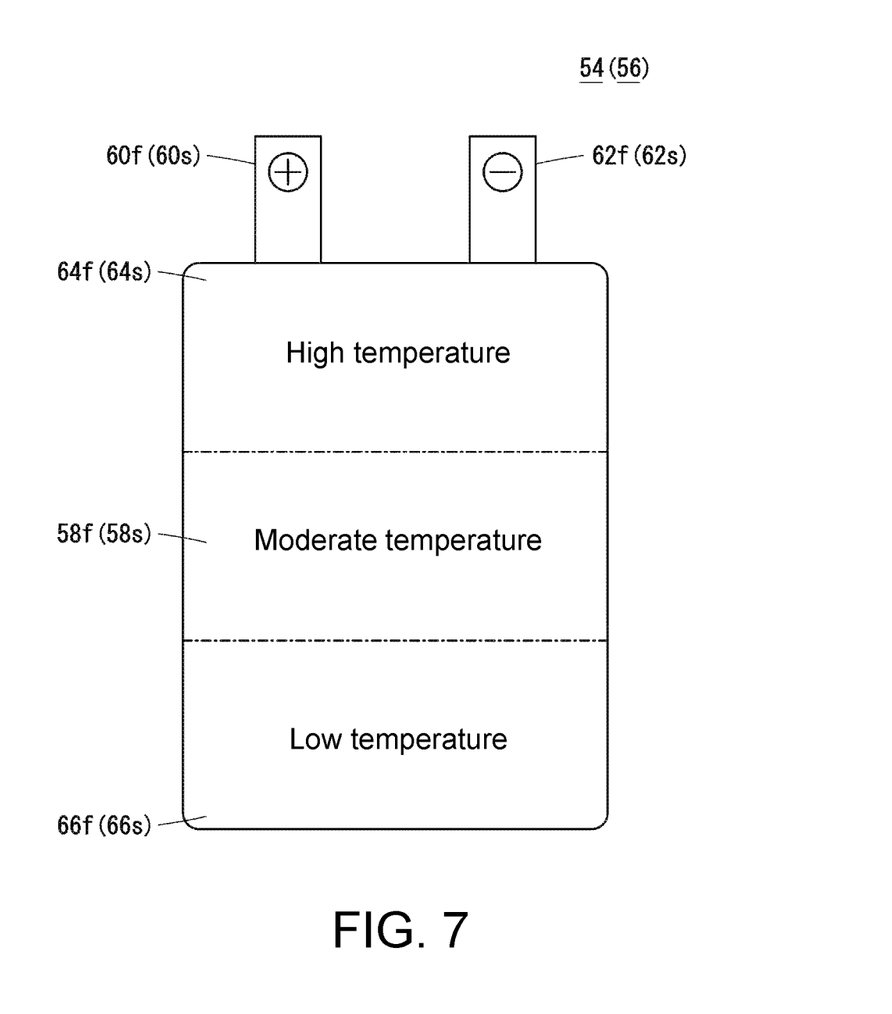
FIG. 7 is a front view of a unit cell showing a temperature difference when the unit cell is hot.

Due to the discharging and charging, the first unit cell 54 and the second unit cell 56 become hot. As shown in FIG. 7, in the first unit cell 54 and the second unit cell 56, the amount of heat is maximum on the side of the first end portions 64f and 64s where the positive electrode terminals 60f and 60s and the negative electrode terminals 62f and 62s project, and the amount of heat is minimum on the side of the second end portions 66f and 66s on the opposite side. Therefore, a temperature difference occurs between the first end portions 64f and 64s, which have a high temperature, and the second end portions 66f and 66s, which have a low temperature.

Here, in the first embodiment, the second end portion 66s of the second unit cell 56 is in contact with the first end portion 64f of the first unit cell 54. Further, the second end portion 66f of the first unit cell 54 is in contact with the first end portion 64s of the second unit cell 56. In this way, in both the first unit cell 54 and the second unit cell 56, the second end portions 66s and 66f, which have a relatively small amount of heat and a low temperature, are in contact with the first end portions 64f and 64s, which have a large amount of heat and a high temperature. Therefore, the heat of the first end portions 64f and 64s is transferred to the second end portions 66s and 66f in contact with the first end portions 64f and 64s.

As a result, the temperature of the first end portions 64f and 64s decreases while the temperature of the second end portions 66s and 66s increases. Thereby, the temperature difference between the first end portions 64f and 64s and the second end portions 66s and 66f is reduced. That is, it is possible to equalize the heat in each of the first unit cell 54 and the second unit cell 56 as much as possible.

When the multicopter 10 changes from steady flight to emergency landing for some reason, it is assumed that the required electric power to the first unit cell 54 and the second unit cell 56 (battery pack 33) is larger than that at the time of normal takeoff or landing. If the required electric power becomes large when there is a large temperature difference in each of the first unit cell 54 and the second unit cell 56, there is a concern that the temperatures of the first unit cell 54 and the second unit cell 56 may rise excessively locally.

However, in the first embodiment, as described above, the temperature difference between the first unit cell 54 and the second unit cell 56 can be reduced as much as possible. Therefore, the concern that the temperatures of the first unit cell 54 and the second unit cell 56 may rise excessively is eliminated. As described above, according to the first embodiment, the relatively low temperature second end portion 66s of the second unit cell 56 is brought into contact with the relatively high temperature first end portion 64f of the first unit cell 54, and the relatively high temperature first end portion 64s of the second unit cell 56 is brought into contact with the relatively low temperature second end portion 66f of the first unit cell 54. Therefore, the heat distributions of the first unit cell 54 and the second unit cell 56 in the battery set 48 can be suppressed. As a result, even if a large amount of electric power is required, it is possible to prevent the temperatures of the first unit cell 54 and the second unit cell 56 from rising excessively.

In addition, the heat of the first unit cell 54 and the second unit cell 56 is quickly conducted to the heat conductive materials 50 sandwiching the battery set 48. Further, since the upper ends of the heat conductive materials 50 are inserted into the cooling jacket 72, the heat conducted from the first unit cell 54 or the second unit cell 56 to the heat conductive material 50 is quickly taken by the cooling medium circulating in the cooling jacket 72. The cooling medium heated accordingly returns from the refrigerant outlet pipe 76 to the circulation supply pipe 78 under the action of the circulation pump 80, and further transfers the heat to the atmosphere or the like while circulating in the cooling heat exchanger 82. This heat transfer lowers the temperature of the cooling medium. The cooling medium cooled down is resupplied to the cooling jacket 72.

As described above, the heat of the first unit cell 54 and the second unit cell 56 is quickly removed. In other words, the first unit cell 54 and the second unit cell 56 are quickly cooled, which also prevents the temperatures of the first unit cell 54 and the second unit cell 56 from rising excessively.

Therefore, it is not particularly required to add a large-scale cooling facility to the battery module 30. This is because the heat conductive material 50 and the cooling jacket 72 can sufficiently remove the heat of the first unit cell 54 and the second unit cell 56, as described above. Therefore, it is possible to simplify the related equipment of the battery system 32 or the battery module 30. Therefore, the flexibility in the device layout in the multicopter 10 is improved. Furthermore, there are advantages that the total weight of the multicopter 10 is reduced and the power consumption is also reduced.

Next, a battery module 100 constituting a battery system according to the second embodiment will be described with reference to FIG. 8 to FIG. 11. The same components as those shown in FIG. 1 to FIG. 7 are assigned with the same reference numerals, and detailed description thereof will be omitted.

Figure 8:
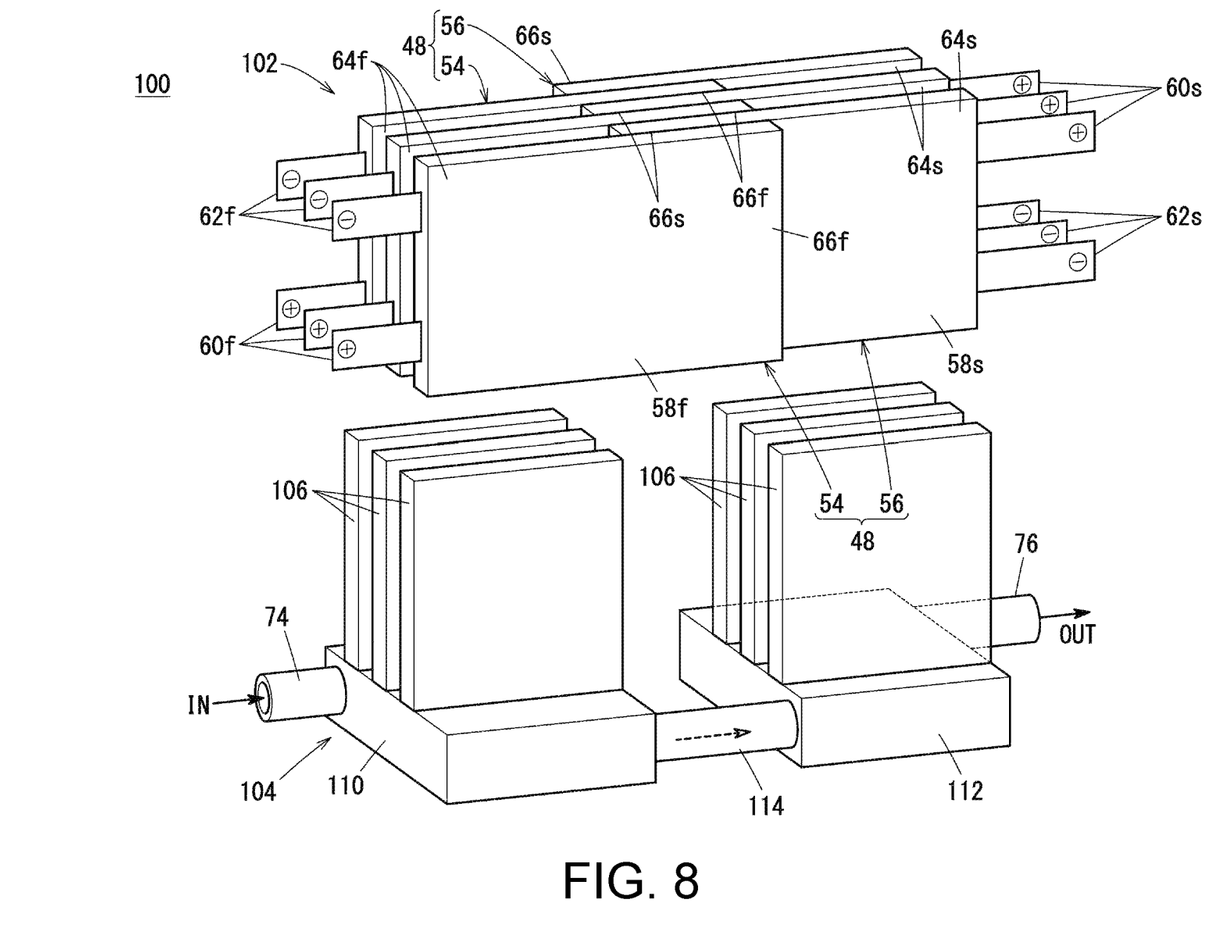
FIG. 8 is a partially disassembled schematic perspective view of a laminated body constituting a battery module included in a battery system according to the second embodiment.
Figure 9:
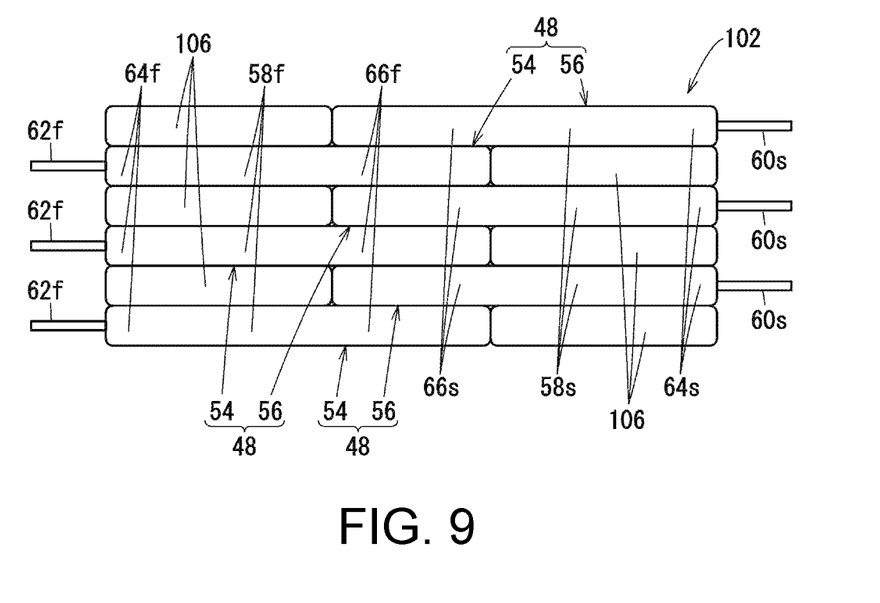
FIG. 9 is a schematic plan view of the laminated body shown in FIG. 8.
Figure 10:
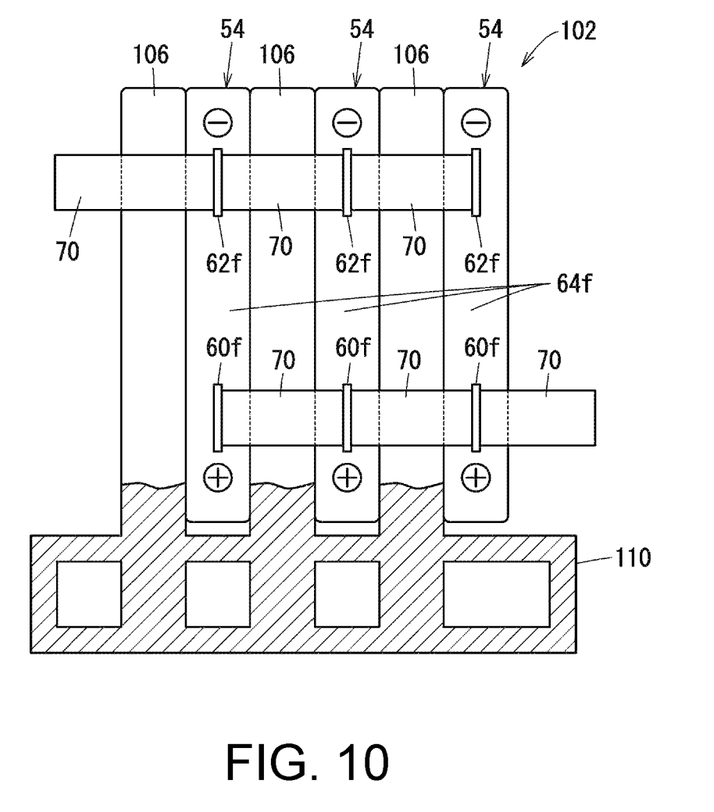
FIG. 10 is a schematic front view of the laminated body shown in FIG. 8.

FIG. 8 to FIG. 10 are a partially disassembled schematic perspective view, a schematic plan view, and a schematic front view of a laminated body 102 that constitutes the battery module 100, respectively. In this case, the laminated body 102 housed in the module case 86 (see FIG. 3) has fin portions 106 of a cooling jacket 104, and a plurality of battery sets 48. In the battery set 48 according to the second embodiment, the second end portion 66f of the first unit cell 54 and the second end portion 66s of the second unit cell 56 are in contact with each other (see particularly FIG. 9).

Figure 11A:
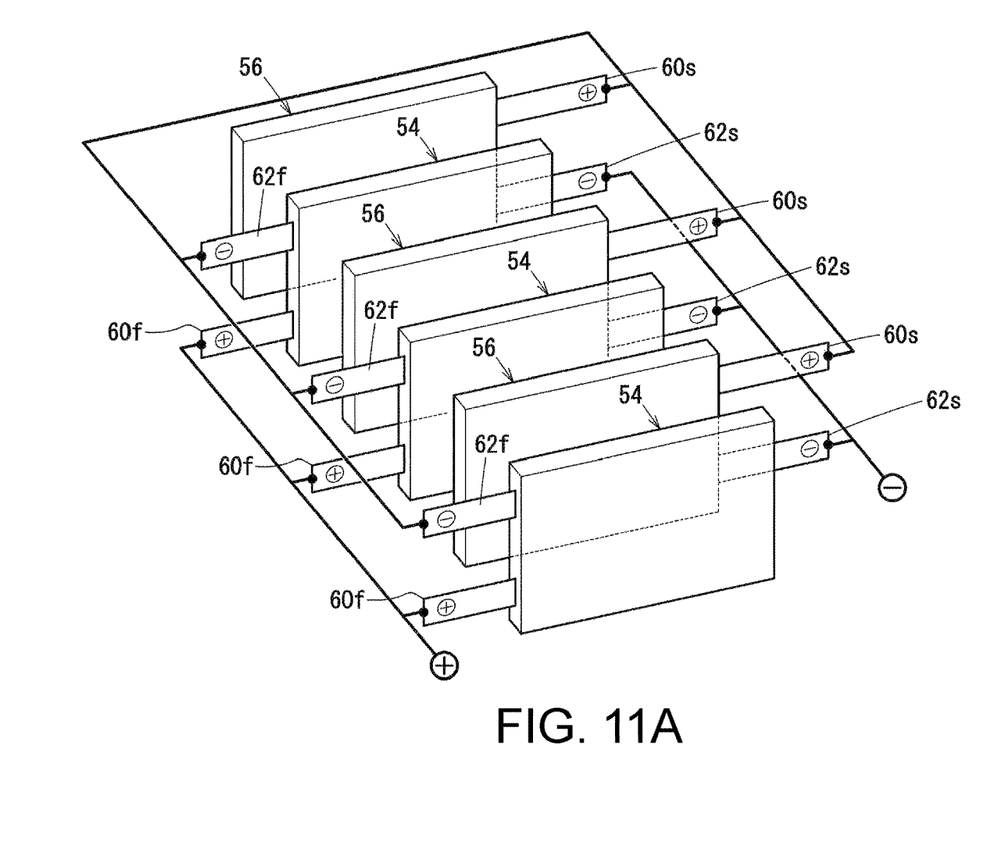
FIG. 11A is a connection explanatory view showing a relationship of electrical connection between a positive electrode terminal and a negative electrode terminal.

In addition, the first unit cell 54 of each battery set 48 is aligned in a position that the positive electrode terminal 60f faces downward and the negative electrode terminal 62f faces upward, for example. On the other hand, the second unit cell 56 of each battery set 48 is aligned in a position that the negative electrode terminal 62s faces downward and the positive electrode terminal 60s faces upward. Then, as shown in FIG. 10 and FIG. 11A, the positive electrode terminals 60f of the first unit cells 54 are electrically connected to each other via the bus bar 70. Further, the negative electrode terminal 62f of the first unit cell 54 and the positive electrode terminal 60s of the second unit cell 56 are electrically connected via the bus bar 70, and the negative electrode terminals 62s of the second unit cells 56 are electrically connected to each other via the bus bar 70.

Figure 11B:
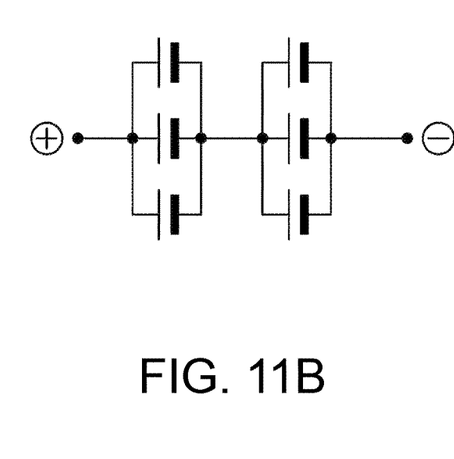
FIG. 11B is an equivalent circuit thereof.

Therefore, in the second embodiment, the first unit cells 54 connected in parallel to each other and the second unit cells 56 connected in parallel to each other are connected in series. The equivalent circuit at this time is shown in FIG. 11B.

In the second embodiment, the cooling jacket 104 has two plate-shaped portions 110 and 112 for circulating the cooling medium. The plate-shaped portion 110 is provided with a refrigerant inlet pipe 74, and the plate-shaped portion 112 is provided with a refrigerant outlet pipe 76. Then, a refrigerant relay pipe 114 is bridged between the two plate-shaped portions 110 and 112. The plate-shaped portions 110 and 112 are separated by the length of the refrigerant relay pipe 114.

The fin portions 106 that function as the heat conductive material are erected on the plate-shaped portions 110 and 112, respectively. As shown in FIG. 10, the lower ends of the fin portions 106 are coupled to the plate-shaped portions 110 and 112, whereby the fin portions 106 are supported by the plate-shaped portions 110 and 112.

Therefore, the heat conducted from the first unit cell 54 or the second unit cell 56 to the fin portions 106 (heat conductive material) is quickly taken by the cooling medium circulating in the plate-shaped portions 110 and 112.

Here, the member integrally having the plate-shaped portion 110 (or the plate-shaped portion 112) and the fin portions 106 can be manufactured, for example, by extrusion-molding a work made of an aluminum alloy. Thereafter, the plate-shaped portion 110 may be provided with the refrigerant inlet pipe 74, the plate-shaped portion 112 may be provided with the refrigerant outlet pipe 76, and the plate-shaped portion 110 and the plate-shaped portion 112 may be connected by the refrigerant relay pipe 114.

As shown in FIG. 9, the first end portion 64f of the first unit cell 54 of any battery set 48 and the first end portion 64f of the first unit cell 54 of another battery set 48 adjacent to the battery set 48 is separated by the thickness of the second unit cell 56. Similarly, the first end portion 64s of the second unit cell 56 of any battery set 48 and the first end portion 64s of the second unit cell 56 of another battery set 48 adjacent to the battery set 48 is separated by the thickness of the first unit cell 54. The fin portion 106 is inserted between the separated first end portions 64f and first end portions 64s and is in contact with the first end portions 64f and 64s.

Therefore, in the second embodiment, the heat of the first end portions 64f and 64s, which have a relatively high temperature, is conducted to the fin portion 106. Accordingly, the temperatures of the first end portions 64f and 64s decreases. On the other hand, since the fin portion 106 is not in contact with the second end portions 66f and 66s, which have a relatively low temperature, the temperatures of the second end portions 66f and 66s do not decrease significantly. Therefore, the temperature difference between the first end portions 64f and 64s and the second end portions 66f and 66s is reduced. That is, in the second embodiment, it is also possible to equalize the heat in each of the first unit cell 54 and the second unit cell 56 as much as possible.

Further, since the cooling medium circulates in the plate-shaped portions 110 and 112, the heat of the fin portion 106 is quickly taken by the cooling medium. That is, in the second embodiment, it is also possible to quickly remove the heat of the first unit cell 54 and the second unit cell 56.

For the above reasons, the second embodiment achieves the same effects as the first embodiment.

The disclosure is not particularly limited to the above-described embodiments, and various modifications can be made without departing from the gist of the disclosure.

For example, the battery modules 30 and 100 are not necessarily mounted on an aircraft such as the multicopter 10 and may also be mounted on a land-based vehicle such as a four-wheeled vehicle or a two-wheeled vehicle, or a water-based operating body such as a ship. Further, the battery system 32 including the battery module 30 and the battery system including the battery module 100 may be of a so-called stationary type.

Furthermore, the number of the battery modules 30 and 100 housed in the casing 34 is arbitrary, and may be one.

What is claimed is:

1. A battery system, comprising a battery module having a plurality of unit cells in which positive electrode terminals and negative electrode terminals are oriented and extend in a same direction, wherein
   a plurality of battery sets are arranged in parallel, in which first unit cells and second unit cells are adjacent, wherein the first unit cell has a positive electrode terminal and a negative electrode terminal oriented and extending in a first direction from a first end portion of a first main body that has the first end portion and a second end portion, and the second unit cell has a positive electrode terminal and a negative electrode terminal oriented and extending in a second direction, which is opposite to the first direction, from a first end portion of a second main body that has the first end portion and a second end portion,
   in the battery sets, at least a part of the first main body and the second main body overlap and are in contact with each other, and
   a heat conductive material that conducts heat from the first unit cell or the second unit cell is in contact with the battery sets, wherein
   a cooling jacket has fin portions as the heat conductive material, and
   the fin portions are inserted in intervals formed by two of the first unit cells and intervals formed by two of the second unit cells respectively, and
   the fin portions are in physical contact with the two of the first unit cells and the two of the second unit cells respectively.

2. The battery system according to claim 1, wherein the first end portion of the first main body and the second end portion of the second main body are in contact with each other and the second end portion of the first main body and the first end portion of the second main body are in contact with each other, and the first main body and the second main body are sandwiched by two heat conductive materials.

3. The battery system according to claim 2, comprising a heat capturing part that supports the heat conductive material and takes heat from the heat conductive material.

4. The battery system according to claim 3, wherein the heat capturing part is a cooling jacket.

5. The battery system according to claim 1, wherein the second end portion of the first main body and the second end portion of the second main body are in contact with each other, and the heat conductive material is sandwiched between the first end portion of the first main body and a first end portion of a first main body of a first unit cell of an adjacent battery set and the heat conductive material is sandwiched between the first end portion of the second main body and a first end portion of a second main body of a second unit cell of an adjacent battery set.

6. The battery system according to claim 5, comprising a heat capturing part that supports the heat conductive material and takes heat from the heat conductive material.

7. The battery system according to claim 6, wherein the heat capturing part is a cooling jacket.

8. The battery system according to claim 1, comprising a heat capturing part that supports the heat conductive material and takes heat from the heat conductive material.

9. The battery system according to claim 8, wherein the heat capturing part is a cooling jacket.

10. An aircraft equipped with the battery system according to claim 1.

* * * * *